United States Patent Office 2,880,520
Patented Apr. 7, 1959

2,880,520

PROCESS FOR DRYING CHARGED STORAGE BATTERY PLATES

Herbert Mark Ellis, Wayland, and Alfred Shaines, Lexington, Mass., assignors to W. R. Grace & Co., Cambridge, Mass., a corporation of Connecticut Application August 22, 1956, Serial No. 605,524

2 Claims. (Cl. 34—29)

The dry charged battery is becoming increasingly more important to the economy of storage battery manufacture. Its use eliminates some of the seasonal production problems and the maintenance and aging in stock which accompany charged and wet batteries, and reduces the return of over-aged batteries from the field.

There are, however, certain major difficulties involved in producing dry charged batteries. In order for a dry charged battery to become operative when electrolyte is added to it, the chemical composition of the dried plates must be substantially the same as that of the wet plates at the end of the forming or charging operation. This is not difficult to accomplish with the positive plates, which consist in their fully charged condition mainly of lead peroxide, which is stable under drying conditions. Negative plates, on the other hand, are made up of spongy, porous metallic lead which will oxidize quite rapidly when exposed to oxygen, as, for example, when dried in air. Drying these negative plates without excessive formation of lead oxide has been the most difficult part of producing dry charged batteries, and various methods of accomplishing this result have been tried.

In one method, low pressure super-heated steam is used as the drying atmosphere, while another makes use of heated carbon dioxide or nitrogen. Still other methods dry the plates in a confined air space between the platens of a press, or under vacuum. All these processes have as their central principle the exclusion of air from the plates, or the severe limitation of the quantity of air which is allowed to strike the plates.

We have discovered that charged automotive storage battery plates may be dried in a blast of heated air without harmful oxidation of the negative plates, provided that the velocity and temperature of the air are carefully controlled within certain definite limits.

The invention may be more fully understood by reference to the accompanying drawings in which Figure 1 is a schematic view of a machine suitable for carrying out the process of our invention;

Figure 1:
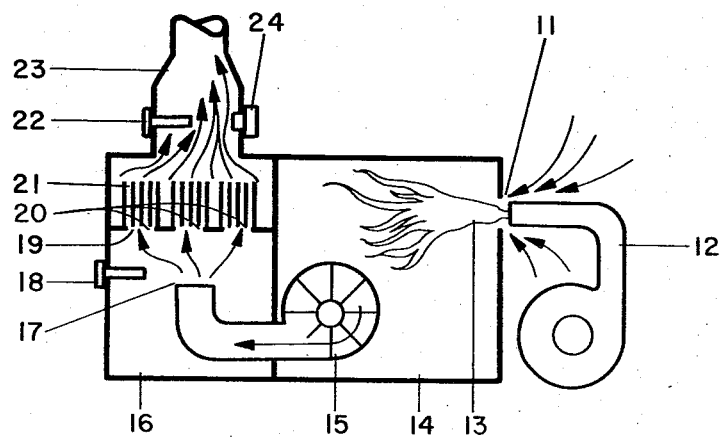

All batteries, whether charged and wet or dry charged, must meet certain standards of performance which are accepted by the industry. According to the S.A.E. specification, one of the commonest of such standards, a 6-volt 100-ampere dry charged battery, when filled with acid at 80° F. and discharged at 300 amperes, must develop a five-second voltage of greater than 4.1 volts, and must maintain a voltage of greater than one volt per cell for at least three and one-half minutes. The number of minutes for which a given battery will maintain a voltage in excess of one volt per cell is referred to as the "capacity" of the battery. It has been thought in the past that in order for a dry charged battery to pass the above specifications, the negative plate must contain not more than 10% PbO after drying. We have discovered, to the contrary, that dry charged batteries will meet the necessary requirements of capacity and voltage when the plates have been dried by our new process, even though the dried negative plates contain a substantially higher PbO content, for example, up to 21%. Accordingly, in our development work, we have used performance of the finished battery rather than chemical composition as a criterion for acceptable battery plates.

The amount of residual moisture in both plates and separators of dry charged batteries is also highly significant, since moisture will cause deterioration of the plates on storage. A maximum of 0.2% of moisture is allowable in the plates according to Army Ordnance specifications, while a maximum of 2% of moisture in the separators is the usual limitation. Our drying process produces battery cell elements which contains substantially smaller quantities of moisture than those allowed by the above specifications, and in addition, ensures a uniformity of drying which it has been impossible to achieve with prior art processes. Battery cell elements made according to our process, therefore, have a more uniform and predictable and in many cases a longer "shelf-life" than elements dried by prior art processes—a factor of substantial commercial importance.

We have discovered that in order to produce acceptable dried battery plates, the air which is used in drying must pass over the plates at a velocity of at least about 2,000 feet per minute. The term "velocity" as used herein signifies the average linear velocity of the air as it passes through the interstices between plates and separators of the cell groups, and is computed by multiplying the measured velocity of the air in the exhaust stack of the drying apparatus by the ratio between the area of the exhaust stack and the total area of the interstices between the plates and the separators of the cell elements in the drying chamber.

It is necessary also to heat the air, and we have found that the temperature of the air must be related to the velocity in a definite way, which may be expressed as the equation $V+40T=14,600$, where V equals the velocity of the air in feet per minute and T equals the temperature of the air. We have also determined that T must not exceed 425° F., for above this temperature the plates are burned.

Figure 2:
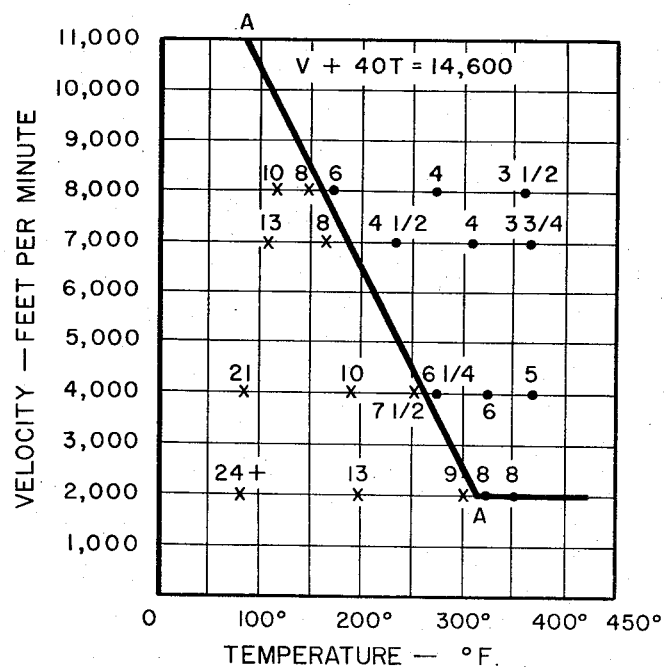
Figure 2 is a graph which shows the relationship between the velocity and the temperature of the air used in the drying process.

Figure 2 of the drawings shows this relationship in graphic form. Battery plates have been dried in air at a number of different velocities and temperatures, and the resulting dried plates have been assembled into batteries and tested for performance. The length of time required to dry the plates to an acceptable dryness has also been recorded. Air velocities of 2,000; 4,000; 7,000; and 8,000 feet per minute were used and the temperatures varied from about 80° F. to 425° F. Temperature was then plotted against velocity. Points designated on the resulting graph, Figure 2, by a dot represent battery plates which gave acceptable performance in an assembled battery. Points designated "X" represent plates which did not pass performance standards. In addition, the length of the drying operation in minutes was noted above the points for purposes of comparison. It will be seen that points which lie to the right of line A—A on the graph represent conditions of velocity and temperature which result in acceptable dried battery plates, while conditions of velocity and temperature represented by points to the left of line A—A produce dried battery plates which will not pass standards of minimum performance. Line A—A represents a velocity-temperature relationship which can be expressed also as the equation $V+40T=14,600$. Accordingly, in order to practice the process of our invention, the velocity and temperature of the blast of air used in the drying process must be related by the equation $V+40T=14,600$, where V is at least 2,000 feet per minute and T does not exceed 425° F. It will be noted that much lower temperatures can be used as the velocity is increased. Theoretically, the velocity can be increased almost indefinitely, but we have found that it is not practical to operate much above 8,000 feet per minute for two reasons. For one thing, higher velocities are likely to damage the plates by blowing the paste off the grids, and further, not enough benefit is gained from using the higher velocities to justify the greater expense which they entail. It is entirely possible, however, that improvements in the preparation of battery plates or in blower design may in the future make it possible to use velocities in excess of 8,000 feet per minute.

Further reference to the graph of Figure 2 will show that the drying times vary strikingly with the varying velocities and temperatures. It will be seen that all the battery plates which pass our performance tests have been dried for a period of eight minutes or less and that most of the acceptable plates have been dried in less than six minutes. The drying times for plates which have failed to pass our performance tests, on the other hand, will be seen to range all the way up to twenty-four minutes.

Figure 3:
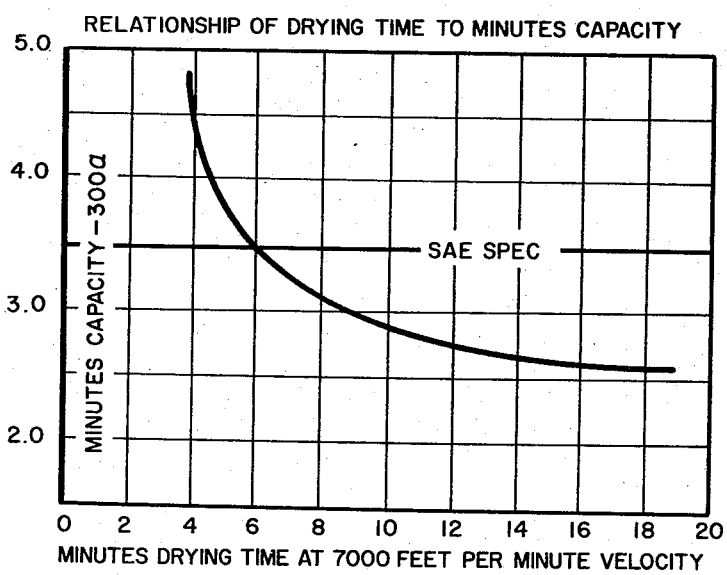
Figure 3 is a graph which illustrates the relation of drying time to performance of the finished battery.

There is a relationship between the length of the drying operation and the performance of the finished plates, as will be seen by reference to Figure 3, in which minutes of drying time of the plates at a velocity of 7,000 feet per minute is plotted against capacity of the finished battery. It will be noted that plates dried for six minutes or less give satisfactory capacity, while plates dried for a longer time fail to meet this performance standard.

Our experimental work has shown that oxidation of the spongy metallic lead of the negative plates takes place most rapidly in an atmosphere in which oxygen, moisture and heat are present simultaneously. The presence of moisture and heat alone in an atmosphere from which oxygen has been excluded does not cause substantial oxidation, as will be seen from the fact that negative plates may be heated to very high temperatures in superheated steam without oxidation. Completely dry plates, on the other hand, may be heated in air for long periods without substantial oxidation. In any air-drying process, the plates must necessarily be subjected to the oxygen-moisture-heat combination which has proved to be so favorable to oxidation. We believe that the reason why we have been able to keep the amount of oxidation to an acceptable level even when using an air-drying process is that we have now been able to reduce so tremendously the time during which the negative plates are exposed to the oxygen-moisture-heat combination.

Figure 4:
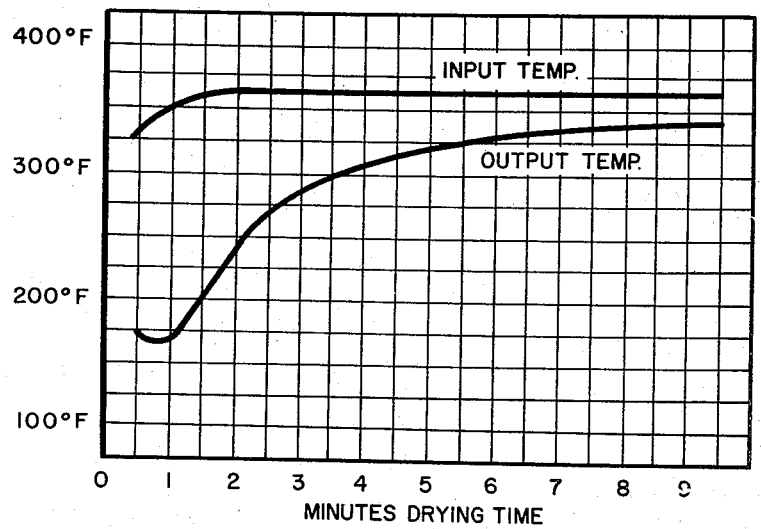
Figure 4 is a graph which shows the change in temperature of the output air as drying proceeds to completion.

Referring to the graph of Figure 4, it will be seen that the air which passes over the plates during the initial stages loses much of its heat due to the evaporation of moisture from the plates. We believe that while evaporation is taking place rapidly, steam is formed, and helps to exclude air from the plates. The critical period comes when the curve of Figure 4 begins to rise, showing a rise in temperature concurrent with a fall in moisture content. At this point, the oxygen-moisture-heat combination tends to induce rapid oxidation of the plates. It has been our object to pass through this critical stage as rapidly as possible, in other words to keep the slope of the curve of Figure 4 as steep as possible. We have accomplished this object by the use of the specific air velocities and temperatures described above as essential to the practice of our invention.

There are two usual methods of making dry charged batteries. In the first, the plates are charged either as large temporary cells in large tanks or as burned groups in ordinary oversize battery jars. In some cases, the tanks have plate slots to hold the plates apart; in others, temporary separators are used which are later removed. After charging, the plates or groups are washed and dried, and are then assembled into battery cells, using new separators which have also been dried. This method, of necessity, involves much handling of both plates and separators.

The second method, analogous to that used in forming charged and wet batteries, is far more economical of both time and handling, and results in fewer damaged plates and separators. According to this method, plates and separators are assembled into battery cells and are thereafter handled as units through all the charging, washing, and drying operations. Drying complete cells by the processes and equipment available in the past, however, has been slow and tedious, and unsatisfactory as to results. For this reason, the majority of dry charged batteries have been made by the first of the above-described methods. One of the benefits of our invention is that it provides a process and a machine by which complete cell units can be dried easily and quickly with a minimum of handling of the cell units and with a minimum of chemical change of the material of the plates. The invention may, of course, be used for drying unassembled plates if this is desired, but it will generally be found more useful with complete cell units.

According to the process of our invention, positive and negative plates and separators are assembled to form complete battery cell elements and are charged in forming acid in the usual way. When the charge is complete, the elements are removed from the acid and treated by washing or neutralization to remove excess acid. When this is accomplished by washing, acid is considered to have been sufficiently removed when the pH of the wash water is 3 or higher.

Reference is made to Figure 1 of the drawings in the following description of our preferred method of drying the charged battery cells. The wet cell elements 21 are set in openings 20 in the floor of drying chamber 16 of Figure 1. Drying chamber 16 is so arranged that when the elements are in place, the only possible route for air passing through the drying chamber is through the cell elements themselves, i.e. through the interstices 19 between the plates and the separators of the elements. In cases where fewer elements are to be dried than the number of openings provided in the floor of the drying chamber, the unused openings are closed off prior to the drying operation. In this way, all the air used in the drying process is forced to flow through the elements.

After the elements are placed in the drying chamber 16 air is drawn into combustion chamber 14 through air intake 11, is heated by gas flame 13 to a temperature, for example, of 360° F., and is passed through blower 15. Drying chamber 16 is so arranged that the open ends 19 of the elements 21 are adjacent the blower outlet 17, so that heated air can be forced through the elements in a direction parallel to the plates. The blower is adjusted so that the heated air passes over the plates at a velocity, for example, of 8,000 feet per minute.

A thermometer 18 located at the outlet 17 of blower 15 registers the temperature of the air as it enters drying chamber 16. Another thermometer 22 located in exhaust stack 23 registers the temperature of the air after it has passed through the elements. Under the operating conditions given by way of example, during the initial stage while evaporation of water from the plates is taking place rapidly, the temperature of the exhaust air as registered on thermometer 22 remains at about 175° F. As drying proceeds, the temperature of the exhaust air rises rapidly until the cells are dry, and then levels off at about 320° F. From this point on, the dried cell elements gradually absorb heat until they approach the temperature of the input air. This is illustrated in Figure 4, in which temperature of both input air and output air are plotted against minutes of drying time.

We have taken advantage of the above-described phenomenon to provide an automatic cut-off point for the drying process. A thermostatically controlled cut-off device 24 is adjusted to shut off burner 12 and blower 15 when the temperature of the exhaust air reaches the desired point, for example 320° F. The operation of such thermally controlled cut-off devices is too well known to require further description.

The air which is used to dry the plates may be heated by any suitable means other than by the burner shown in the drawing. For example, a steam coil or an electrical unit may be used.

After completion of the drying process, the battery cell elements are removed from the drying chamber and are ready for assembly into battery cases.

We claim:

1. The method of drying charged assembled storage battery cell elements, which comprises passing a flow of heated air parallel to the surfaces of the plates and of the plate separators in said assembled elements through the interstices of said assembled elements, said flow of heated air having an average velocity in excess of 2,000 feet per minute and a temperature in excess of that defined by the relation $V+40T=14,600$ where $V=$average air velocity in feet per minute and $T=$ambient temperature of incoming air in degrees Fahrenheit, said temperature not exceeding 425° F., the drying of said assembled cell elements being effected in not more than eight minutes.

2. The method according to claim 1 wherein the air which is passed through the elements has a velocity of 8,000 feet per minute and a temperature of 360° F.

References Cited in the file of this patent

UNITED STATES PATENTS

| | | |
|---|---|---|
| 1,994,220 | Hormel | Mar. 12, 1935 |
| 2,134,906 | Byron | Nov. 1, 1938 |
| 2,149,812 | Lindstrom | Mar. 7, 1939 |
| 2,300,628 | Merson | Nov. 3, 1942 |